3,168,156
STEERING AND CONTROL HANDLE
Bronislaus I. Ulinski, Flossmoor, Ill., assignor, by mesne assignments, to Yale & Towne, Inc., New York, N.Y., a company of Ohio
Filed Jan. 11, 1962, Ser. No. 165,530
4 Claims. (Cl. 180—19)

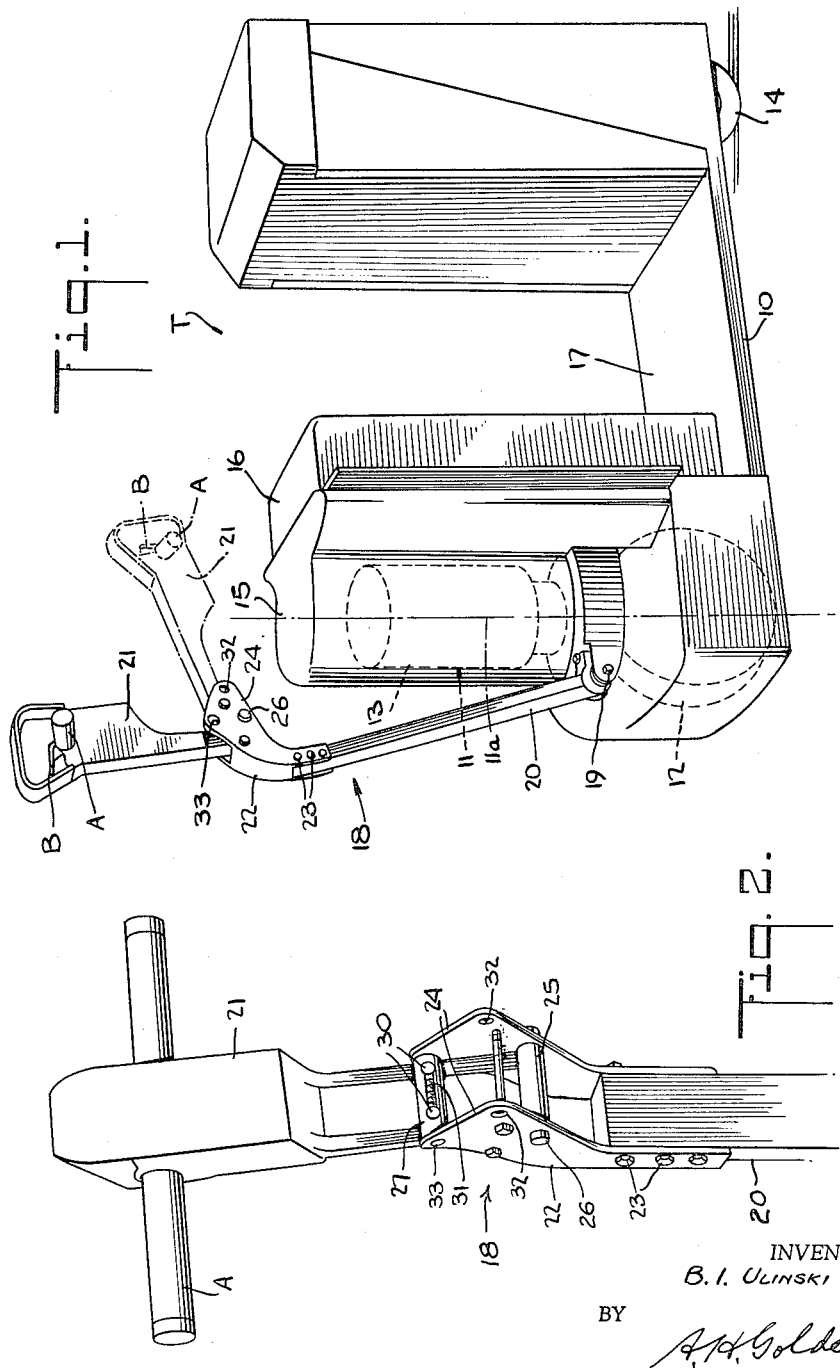

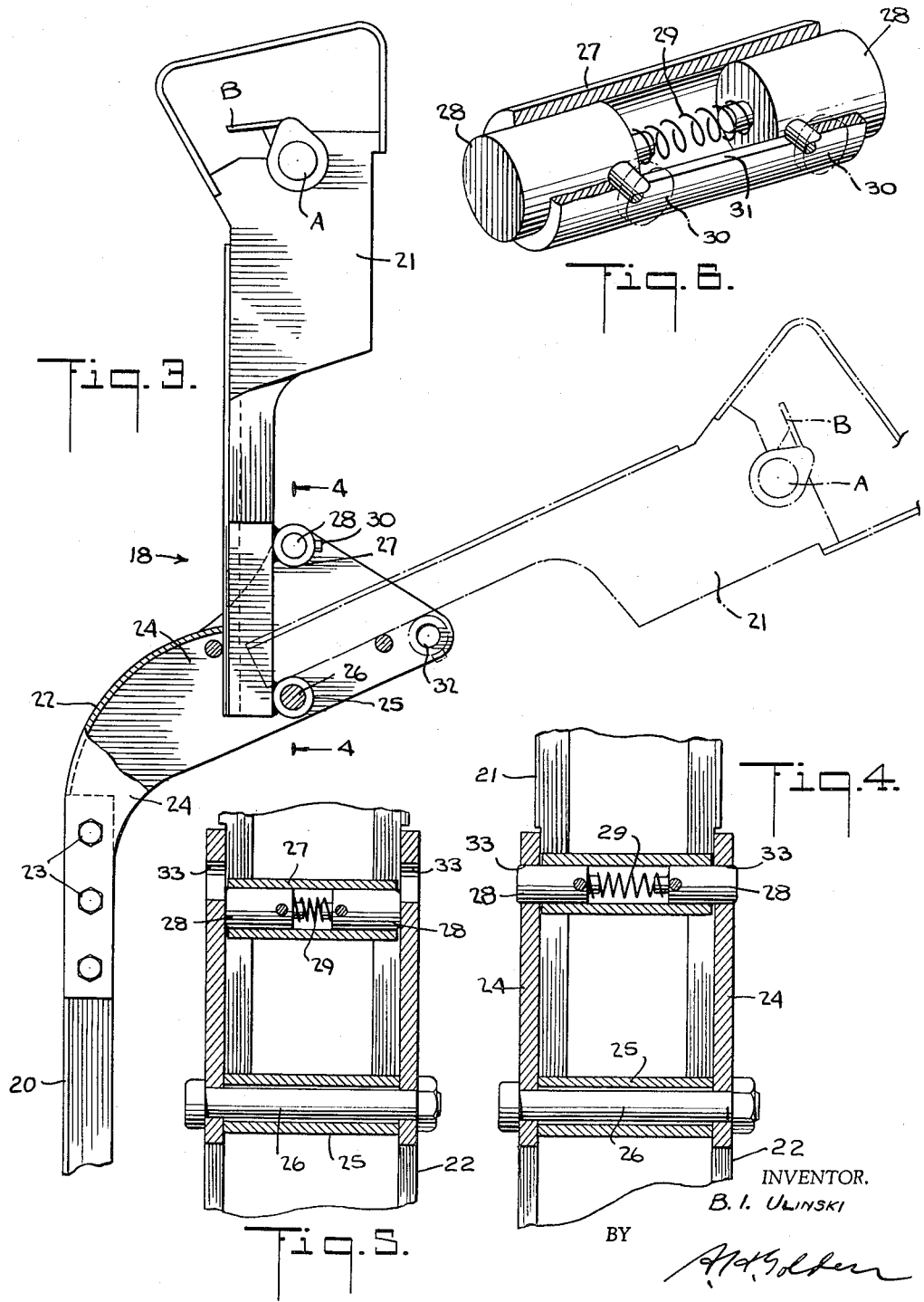

My invention relates to a novel steering and control handle for a motorized industrial truck.

Those persons skilled in the art will appreciate that the trucks of the particular class are equipped with a steering handle that enables an operator to control the movements of the truck while walking ahead of the truck. The novel steering and control handle of my invention is particularly constructed to facilitate control by an operator who may ride upon the truck. The operator also may walk in front of the truck in the usual way, and my novel handle then will allow that ease of control that generally is possible when using more conventional handles.

My steering handle will be mounted to swing between substantially vertical and horizontal positions on the truck, as is usual. As a feature of my invention, I construct my handle with an upper portion that is mounted for movement relatively to a lower portion of the handle, so as to be placed alternately in forwardly and rearwardly extending positions. A detent will latch the upper handle portion in each of those positions, forming a rigid handle that can easily be manipulated and that will offer effective steering control whether used by a walking or a riding operator.

More particularly, I equip the lower portion of my steering handle at its upper end with an angular bracket. That bracket has opposed side members extending in a rearward direction, and between which I assemble the upper portion of the handle.

The side members of the bracket support a pivot on which the upper handle portion swings vertically, with the side members guiding the upper handle portion and holding it firmly in aligned relation to the lower portion. There is a detent that coacts with the side members of the bracket to lock the upper handle portion in its forwardly and rearwardly extending positions. Thus, as a feature of my invention, I contribute a steering handle that will be rigid, while also adapted to articulate in a particular way so as to facilitate to a considerable extent the control of a truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

FIG. 1 shows an industrial truck utilizing my novel steering and control handle.

FIG. 2 shows my handle as viewed from a different angle.

FIG. 3 is a longitudinal section.

FIG. 4 is a transverse section on the line 4—4 in FIG. 3.

FIG. 5 is similar to FIG. 4, but shows the detent means in a release position.

FIG. 6 is a section showing details of the detent.

For the purpose of describing my invention, I show in FIG. 1 an industrial truck T having a main frame 10 that is supported at its forward end on a steering and traction unit 11. As shown in dotted lines in FIG. 1, the steering and traction unit 11 has a usual construction with a traction wheel 12 and a traction motor 13 that drives the wheel 12. Also, the unit 11 is mounted through suitable bearings, not shown, whereby to rotate bodily in a vertical steering axis 11a on truck frame 10 and acting as a steering mounting for wheel 12. I indicate my novel steering and control handle generally by the numeral 18. I shall fully describe the handle 18, but I first call attention to the fact that handle 18 is supported through a rather usual pivot 19 on the front of steering and traction unit 11, whereby to swing bodily in a vertical direction. By moving the handle transversely, the truck operator can rotate unit 11 in its vertical steering axis to steer the truck, as will be understood. The rear end of the truck T moves on wheels 14, one of which may be seen in FIG. 1. As shown, the truck T has a cover 15 that encloses the upper portion of the steering and traction unit 11, and a battery compartment 16 arranged just behind the unit 11. Beyond the battery compartment 16, the truck 10 has an operator's platform 17.

In the novel concept of my invention, I particularly construct the handle 18 with a lower portion 20, that portion extending from the pivot 19, and a relatively movable upper portion 21 that is equipped with conventional hand grips A and manually operated controls B for the traction motor 13. As a medial part of my handle, I utilize an angular bracket 22, well shown in FIGS. 1 and 2. The angular bracket 22 is generally channel shaped in section, and is assembled in position on the upper end of the lower portion 20 of my handle, as by bolts 23. Bracket 22 has opposed side portions 24 that are in angular relation to the lower handle portion 20, so as to extend in a rearward direction relatively to the truck when the handle is in the position shown in FIG. 1.

The upper portion 21 of the handle 18 is assembled between the side portions 24 of the bracket 22, and has welded to it a bearing sleeve 25, FIGS. 2, 3, 4 and 5. Engaged in bearing sleeve 25 is a shaft 26 that is supported at its opposed ends on the side portions 24 of the bracket. Thereby the upper portion 21 of the handle is mounted to rotate in a vertical direction relatively to the lower portion 20, while guided between the bracket portions 24. A further sleeve 27 is welded to the upper handle portion 21 in spaced relation to the sleeve 25, the sleeve 27 being arranged to move between the sides 24 of the bracket 22 as the handle portion 21 rotates on its pivot 26.

As well shown in FIGS. 4, 5 and 6, I mount a pair of opposed detent pins 28 to slide in the sleeve 27, with a coil spring 29 acting between those pins to press them toward the sides 24 of the bracket. Each pin 28 has a finger piece 30 movable in a slot 31 in the sleeve 27, enabling the truck operator to retract the pins 28 against their spring pressure.

As best seen in FIG. 2, I form the side portions 24 of the bracket 22 with a pair of openings 32. Those openings 32 are so arranged as to accept the detent pins 28 when the upper portion of my handle is rotated to extend in a rearward direction relatively to the lower portion 20, as shown in dotted lines in FIGS. 1 and 5. Through the particular arrangement, the detent pins 28 are adapted to lock the upper handle portion 21 relatively to the lower portion 20, with upper portion 21 extending rearwardly past the steering axis 11a of the traction unit 11, as shown in dotted lines in FIG. 1, when the lower handle portion 20 is in position extending upwardly from its pivot. Thereby the hand grips A and manual motor controls B will be supported in a rearward position relatively to the steering axis of the steering and traction unit 11, enabling the steering and motor control to be very easily effected by an operator on the truck platform 17.

I further form the bracket sides 24 with openings 33 that will accept the detent pins 28 when the upper portion 21 of the handle is substantially aligned with the lower portion 20. When the pins 28 are engaged in the openings 33, the upper handle portion 21 again will be locked relatively to the lower portion 20, but the hand grips A and motor controls B now will be in a forward position, enabling my handle 18 to be used in a more conventional way when the operator walks ahead of the truck. It will be appreciated, of course, that the operator may very easily release and lock the upper handle 21 in its rearward and forward positions relatively to lower portion 20, that being done merely through manipulation of the detent finger pieces 30.

It will thus be seen that I contribute a novel steering and control handle that will facilitate to a very considerable extent the control of the truck when an operator rides on the truck. Through my invention, the motor controls and hand grips of a steering handle may very easily be locked in position to be supported rearwardly of the steering axis of the truck, while also adapted to be locked in a conventional forward position. With the controls in their rearward position, an operator riding on the truck will have no difficulty in applying the leverage that may be required to steer the truck. Moreover, my novel steering and control handle will enable an operator to apply effective control while riding in a position that is a considerable distance behind the steering and traction unit on the truck. Thus, I believe that those persons skilled in the art will understand that my invention will enable the trucks of the particular class to be much more effectively controlled, and I believe it will be appreciated that I have made a very considerable contribution to the industrial truck art.

I now claim:

1. In a truck of the class described having
a steering handle arranged at the front of the truck,
a lower portion of said handle pivoted for vertical swinging movement between upwardly extending and forwardly extending positions relatively to the truck, and
movable means connecting the handle to a truck wheel and through which said handle acts to steer the truck,
the improvement that comprises an angular bracket rigidly secured to said lower portion of the handle,
opposed side members of said bracket extending in a rearward direction when the lower handle portion is in an upwardly extending position on its pivot,
an upper portion of said handle assembled between the side members of the bracket and extending beyond said members,
means pivoting said upper handle portion to said side members for guided vertical swinging movement relatively to the lower handle portion,
a spring pressed detent pin acting between said upper handle portion and said bracket for holding said upper portion in an angular position on its pivot whereby to facilitate steering of the truck by an operator riding on the truck,
and means whereby said detent pin is effective also to hold the upper handle portion substantially in aligned relation to the lower portion of the handle for use of the handle by an operator walking ahead of the truck.

2. In a truck of the class described having a wheel on a steering mounting that is mounted for rotation in a steering axis on a front end portion of the truck and that is driven by a traction motor on the truck, and
a steering handle having a lower portion arranged forwardly from the steering axis and pivoted for vertical swinging movement between upwardly extending and forwardly extending positions on the steering mounting of said wheel, the improvement that comprises
an angular bracket rigidly secured to said lower portion of the handle,
opposed side members of said bracket extending in a rearward direction when the lower handle portion is in an upwardly extending position on its pivot,
an upper portion of said handle assembled between the side members of the bracket and equipped with manually operated motor controls,
means pivoting said upper handle portion to the side members of the bracket for guided vertical swinging movement relatively to the lower handle portion,
a releasable pin for locking said upper handle portion to said bracket with the motor controls in a rearward position relatively to the steering axis of the wheel, so as to facilitate driving and steering control of the truck by an operator riding on the truck,
and means whereby said releasable pin is effective also to lock the upper handle portion in position with the motor controls substantially in aligned relation to the lower portion of the handle, for control of the steering and driving by a walking operator.

3. In a truck of the class described, having a steering and traction unit mounted for rotation in a vertical steering axis on the front of the truck, a steering handle for rotating said unit on its mounting, and a pivot coacting with a lower portion of the steering handle to mount said handle for vertical swinging movement between upwardly extending and forwardly extending positions relatively to the steering and traction unit, the improvement that comprises said handle formed to have an upper portion distinct from the lower portion of said handle, pivot means mounting said upper handle portion for vertical swinging movement on the lower portion, releasable detent means engaging between the upper and lower handle portions, parts of said detent means coacting for holding said handle portions in an angular relation in which the upper portion extends rearwardly above the steering and traction unit and beyond the vertical steering axis when the lower handle portion is vertical, and parts of said detent means coacting for holding the handle portions in a relation in which the upper portion will extend forwardly when the lower portion is in forwardly extending position.

4. In a truck of the class described having a steering and traction unit mounted for rotation in a vertical steering axis on the front of the truck, a steering handle for rotating said unit on its mounting, and a pivot coacting with a lower portion of the steering handle to mount said handle for vertical swinging movement between upwardly extending and forwardly extending positions relatively to the steering and traction unit, the improvement that comprises said handle formed to have an upper portion distinct from the lower portion of said handle, pivot means mounting the upper handle portion for vertical swinging movement between a position substantially aligned relatively to the lower portion, and an angular position in which said upper handle portion extends rearwardly above the steering and traction unit and beyond the vertical steering axis when the lower handle portion is vertical, manually releasable detent means engaging between the upper and lower handle portions, and parts of said detent means coacting to hold said portions in rigid relation to each other so that the upper handle portion when in each of its angular and substantially aligned positions will swing integrally with the lower portion about the handle pivot, whereby to facilitate steering of the truck by an operator riding on the truck and by an operator walking ahead of the truck.

References Cited in the file of this patent

UNITED STATES PATENTS

| | | |
|---|---|---|
| 1,548,266 | Hall | Aug. 4, 1925 |
| 2,139,546 | Hansen | Dec. 6, 1938 |
| 2,635,711 | Turner | Apr. 21, 1953 |
| 2,918,134 | Jensen | Dec. 22, 1959 |